United States Patent [19]

Fisher

[11] Patent Number: 5,326,121
[45] Date of Patent: Jul. 5, 1994

[54] HUMAN POWERED FOUR WHEEL ON/OFF ROAD VEHICLE

[76] Inventor: Daniel G. Fisher, 4932 E. 3rd St., Tucson, Ariz. 85711

[21] Appl. No.: 992,063

[22] Filed: Dec. 17, 1992

[51] Int. Cl.$^5$ .................. B62K 19/00; B62K 21/00; B62K 23/00; B62K 27/06
[52] U.S. Cl. ..................... 280/282; 280/112.2; 280/231; 280/273; 280/772
[58] Field of Search ......... 280/267, 230, 231, 209, 280/273, 288.1, 282, 772, 112.2

[56] References Cited

U.S. PATENT DOCUMENTS

| 644,718 | 3/1900 | Miller | 280/231 |
|---|---|---|---|
| 2,789,831 | 4/1957 | Yerik | 280/282 |
| 3,843,145 | 10/1974 | Templeton | 280/282 |
| 4,132,435 | 1/1979 | Wilson | 280/267 |
| 4,674,762 | 6/1987 | Nelson et al. | 280/282 |
| 4,740,004 | 4/1988 | McMullen | 280/282 |
| 4,887,829 | 12/1989 | Prince | 280/282 |

FOREIGN PATENT DOCUMENTS

| 1684159 | 10/1991 | U.S.S.R. | 280/282 |
|---|---|---|---|
| 1288382 | 9/1972 | United Kingdom | 280/282 |

OTHER PUBLICATIONS

Dune Buggies and Hot V.Ws Magazine, pp. 103 and 108, Jun. 1989, by Wright Publishing, P.O. Box 2260 Costa Mesa, CA 92626.

*Primary Examiner*—Mitchell J. Hill
*Attorney, Agent, or Firm*—Ogram & Teplitz

[57] ABSTRACT

A safe, efficient, human powered vehicle for on and off road use. The preferred embodiment has four wheels and seats two operators side by side. The vehicle incorporates several features which drastically reduce the energy required to propel such a vehicle and optimizes the energy produced from the operators. Each operator is provided with an independent foot pedal and drive mechanism. Each independent drive mechanism has multiple speeds which are independently controlled by each operator. The invention allows each operator to provide power to both rear wheels simultaneously. The drive train includes a simple, lightweight, energy efficient freewheel mechanism which acts as a differential and allows each rear wheel to rotate at different speeds when turning corners. This differential mechanism saves energy by eliminating tire skid which occurs when both rear wheels rotate at the same speed during a turn. The suspension system is energy efficient. Both the front and rear suspension systems keep each wheel parallel to the other wheels throughout the suspension travel. The suspension design reduces energy loss due to toe change, bump steer, and the like. The vehicle incorporates a unique braking control mechanism which increases maneuverability and control of the vehicle. The vehicle's four wheel design provides increased stability and safety over conventional two and three wheeled human powered vehicles.

15 Claims, 5 Drawing Sheets

HUMAN POWERED FOUR WHEEL ON/OFF ROAD VEHICLE

BACKGROUND OF INVENTION

This invention relates generally to human powered vehicles and more specifically to four wheel, two person, human powered vehicles.

The history of land based human powered vehicles is relatively short. The first pedal driven bicycles were invented in the mid 1800's. Since that time, land based human powered vehicles have been continually improved, redesigned, modified, and adapted to many uses.

Efficiency has been an important consideration in the design of human powered vehicles. The human body is capable of producing only a fraction of one horse power for any sustained length of time and thus any waste of this energy greatly affects the performance and usefulness of a human powered vehicle.

To improve efficiency, human powered vehicles have become lighter and multi-speed gearing has been added. The frames, wheels, bearings, and tires have all been improved to increase efficiency. Even the position of the operator has been changed to reduce wind resistance and improve human body efficiency.

The most popular of human powered vehicles are bicycles. Bicycles, however, are very unstable by design. At low speeds they tend to fall over. At higher speeds, an unexpected bump, turn, or obstacle can cause the bicycle to crash. If more than one person is to ride on a bicycle they must ride in tandem. The tandem configuration is even more unstable and requires much skill and practice to ride safely.

For these reasons, and others, three and four wheeled human powered vehicles have been developed.

Three and four wheeled human powered vehicles are well known in the art. However, prior designs are all deficient in one or more respects. Examples of patented three and four wheeled vehicles are:

U.S. Pat. No. 4,826,190, entitled "Dual Wheel Driven Tricycle With A Fully Enclosed Multiple Speed Drive" issued to Hartmann on May 2, 1989 shows a single seat tricycle with a multi-speed transmission. This vehicle does not have four wheels, carries only a single operator, does not have any suspension, uses a complex transmission mechanism and does not have a single control for independently controlling the braking applied to each rear wheel. This vehicle's freewheels for dual wheel drive are mounted on heavier load bearing axles at each rear wheel.

U.S. Pat. No. 4,070,032, entitled "Four Wheel Pedal Driven Vehicle" issued to Cunningham on Jan. 24, 1978 shows a four wheel tandem vehicle. This vehicle does not have an independent drive train for each operator nor does it allow each operator to use a different gear ratio. It drives only one rear wheel in the forward speed and has no substantial suspension system.

U.S. Pat. No. 4,9663,381 entitled "Adult Tricycle" issued to Feikema on Oct. 30, 1990 shows a one person tricycle. This vehicle does not have four wheels, only drives a single rear wheel, has room for only one operator, and has no suspension system.

U.S. Pat. No. 4,674,762 entitled "Four-Wheel, Reclining Position Cycle" issued to Nelson et al. on Jun. 23, 1987 shows a one person four wheel human powered vehicle This vehicle only seats one operator, drives only one rear wheel, has no suspension, and does not provide for controlling the rear brakes independently.

U.S. Pat. No. 4,792,149 entitled "Pedal-Powered Golf Cart" issued to Harmon on Dec. 20, 1988 shows a three wheel two person human powered vehicle. This vehicle uses a transmission box, a drive shaft, and differential joint. The drawbacks of this vehicle are that it is specifically adapted for use on a golf course or the like. It is not designed for high speeds, does not provide independent gearing for each operator, and has very limited suspension.

U.S. Pat. No. 4,093,258 entitled "Multipassenger Pedal vehicle" issued to Ansel on Jun. 6, 1978 shows a multi-passenger vehicle with three, four or more wheels. This vehicle only allows an operator to drive a single rear wheel. It is a tricycle like configuration which is inherently unstable, and does not have any suspension.

U.S. Pat. No. 4,925,200 entitled "Tricycle Drive Mechanism" issued to Jones on May 15, 1990 shows a single passenger tricycle. This vehicle uses a push-pull type drive mechanism instead of a cranking foot pedal. The operator uses both his arms and his legs to propel the vehicle. This vehicle only allows one operator, does not have multiple gearing and has no suspension.

Clearly, there exists a need for an improved four wheel human powered vehicle which is stable, efficient, seats multiple operators and is usable both on and off road.

SUMMARY OF INVENTION

The invention creates a safe, efficient, human powered vehicle for on and off road use. The preferred embodiment has four wheels and seats two operators side by side. The vehicle incorporates several features which drastically reduce the energy required to propel such a vehicle and optimizes the energy produced from the operators.

Each operator is provided with an independent foot pedal and drive mechanism. Each independent drive mechanism has multiple speeds which are independently controlled by each operator. The invention allows each operator to provide power to both rear wheels simultaneously. The drive train includes a simple, lightweight, energy efficient freewheel mechanism which acts as a differential and allows each rear wheel to rotate at different speeds when turning corners. This differential mechanism saves energy by eliminating tire skid which occurs when both rear wheels rotate at the same speed during a turn.

The suspension system is energy efficient. Both the front and rear suspension systems keep each wheel parallel to the other wheels throughout the suspension travel. The suspension design reduces energy loss due to toe change, bump steer, and the like. The vehicle incorporates a unique braking control mechanism which increases maneuverability and control of the vehicle. The vehicle's four wheel design also provides increased stability and safety over conventional two and three wheeled human powered vehicles.

The first significant feature of the preferred embodiment is the independent foot pedal and drive mechanism provided for each operator. The independent foot pedals and drive mechanisms allow each operator to supply power to both rear wheels.

The preferred embodiment provides for multiple gearing on each independent drive mechanism. Each operator controls the gearing of his/her drive mechanism. This allows each operator to use different gearing while both operators simultaneously provide power to both rear wheels. The independent gearing allows one operator to pedal at a fast cadence and a second operator to pedal at a slow cadence while each simultaneously provides power to both rear wheels. This improves efficiency since, for numerous reasons, occupants often prefer to pedal at different cadences.

A second significant feature of the invention is the differential mechanism. The differential mechanism allows the rear wheels to rotate at different speeds when needed. This is most useful when turning corners. When making a turn, the outer wheel must travel further than the inner wheel. Without a differential, both wheels rotate at the same speed; consequently, the inner wheel is forced to skid causing a waste of energy. This waste of energy is a negligible percentage of the total energy in a motorized vehicle, but is a significant percentage in a human powered vehicle.

The instant invention implements this differential function using a unique combination of a drive bar and freewheels. This design is simple, light weight, and efficient.

A third significant feature of the preferred embodiment is the suspension system. Most human powered vehicles have virtually no suspension system. One reason for this is that a suspension system absorbs energy needed to propel the vehicle. The unique design of the instant invention solves many of the problems associated with suspension systems for human powered vehicles. As a result, the instant invention provides a roughed suspension system which allows the vehicle to travel off road while not absorbing and wasting energy needed to propel the vehicle.

The suspension systems keep all four wheels parallel through out the suspension travel. This design eliminates the waste of energy from toe change, skidding, bump steer, and the like associated with conventional suspension systems.

The front wheels use a "pogo" type suspension system to keep each front wheel parallel to the other wheels at all times. The rear wheels use a "swing arm" type suspension system with pivot points on a horizontal axis to keep each rear wheel parallel to the other wheels at all times.

The fourth significant feature is the "overdrive" gearing. The unique overdrive gearing allows a wider range of gears than in conventional human powered vehicles. The overdrive gearing operates between the drive bar and one rear wheel. It affects the gearing for both operators. The overdrive gears are not used for off road, two wheel drive operation. The overdrive gears are used for high speed travel when only one wheel drive is needed. The wide range of gears allows the vehicle to be efficient both on and off the road.

The fifth feature is the single control variable braking system. The vehicle has brakes on each rear wheel. The braking is controlled by the operator from a single brake control lever. The control lever permits the operator to independently control the amount of braking on each rear wheel. This is useful in many situations, particularly when fast, sharp turning is necessary. For example, when a sharp right turn is desired, the right rear wheel brake is actuated and the left rear wheel is allowed to turn, thus aiding in making a sharp right turn.

The preferred embodiment uses sprockets, freewheels, chains, and derailleurs commonly known in the art to transfer mechanical energy from the pedals to the drive bar and from the drive bar to the rear wheels. However, those of ordinary skill in the art readily see other equivalent implementations of the invention including, but not limited to using belts, gear boxes, drive shafts, torque converters, and the like.

The significant features of the invention are illustrated in the figures and described more fully below.

BRIEF DESCRIPTION OF THE DRAWINGS

FIG. 3a shows the front view of the front suspension system.

FIG. 3b is a cross sectional view taken along the A—A line of FIG. 3a.

DETAILED DESCRIPTION OF THE DRAWINGS

Figure 1:
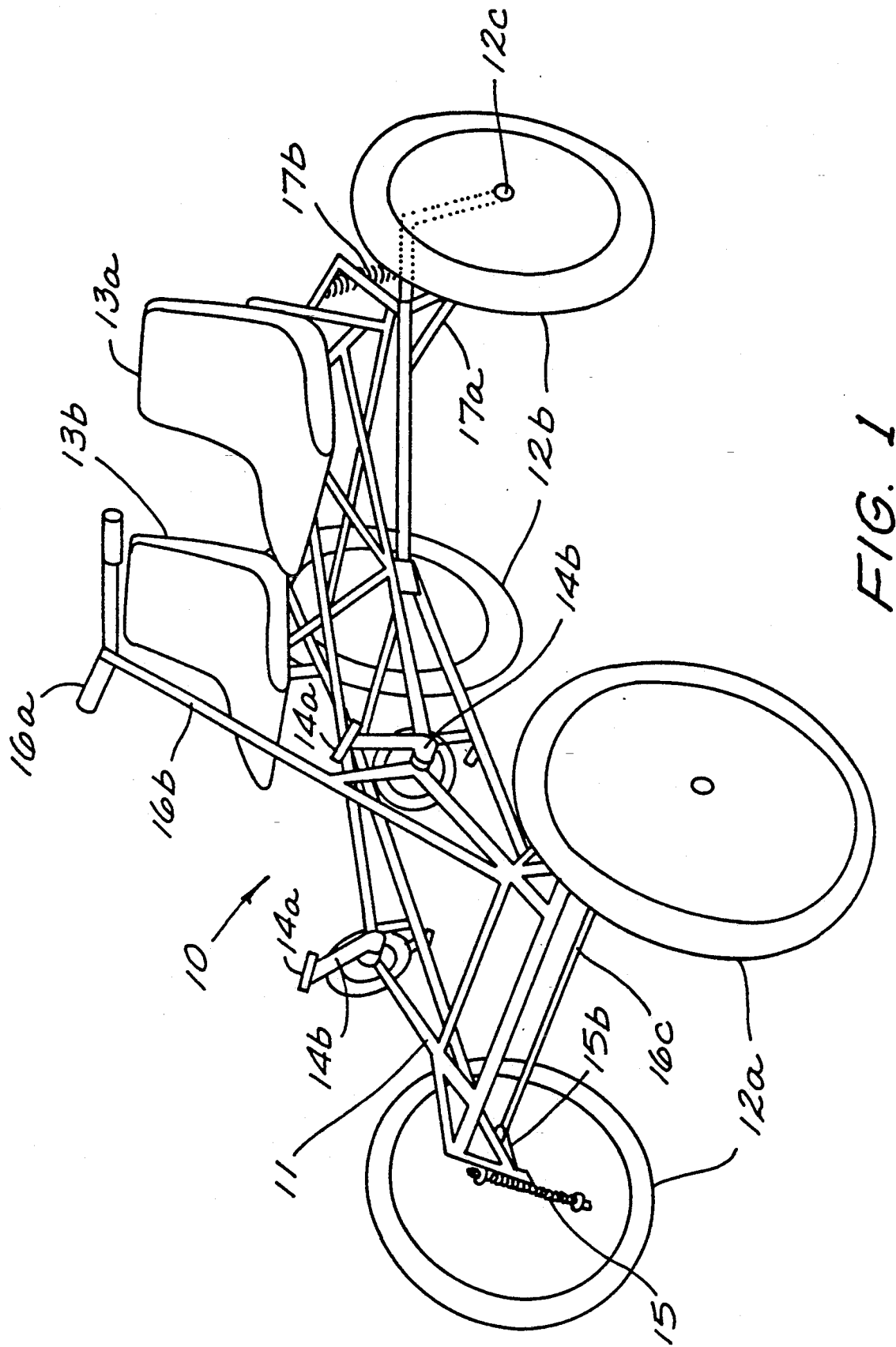
FIG. 1 shows the preferred embodiment of the invention.

FIG. 1 shows the preferred embodiment of the invention.

FIG. 1 shows vehicle 10, frame 11, front wheels 12a, rear wheels 12b, seats 13a and 13b, foot pedals 14a, cranks 14b, front suspension 15, handle bars 16a, steering column 16b, tie rod 16c, and rear suspension 17.

Vehicle frame 11 is made substantially of metal tubing. Frame 11 is fabricated by welding and other fabrication techniques commonly known in the art. The preferred embodiment uses chrommolybdenum tubing because of its strength and light weight. Those of ordinary skill in the art readily see that other materials are useable in place of chrommolybdenum tubing to fabricate frame 11. It is anticipated that frame 11 can be fitted with a body to improve appearance and reduce wind resistance.

Frame 11 is supported by front wheels 12a and rear wheels 12b. Front wheels 12a attach to frame 11 via front suspension 15. Rear wheels 12b attach to frame 11 via rear suspension 17 (partially shown). Rear suspension swing arm 17a attaches to axle 12c on the inner side of rear wheel 12b. Spring 17b attaches between rear suspension swing arm 17a and frame 11. Front wheels 12a and rear wheels 12b rotate on their axles.

Front suspension 15 and rear suspension 17 are described in more detail in subsequent figures.

Vehicle 10 is operable by either one or two human operators. Human operators (not shown) sit in seats 13a and 13b with their feet on pedals 14a. Each human operator supplies rotational energy to propel vehicle 10 via foot pedals 14a and cranks 14b. Pedals 14a and cranks 14b are of conventional design well known in the art. Pedals 14a are rotatably attached to cranks 14b. Cranks 14b are rotatably attached to frame 10. The preferred embodiment includes toe straps (not shown) attached to pedals 14a to hold operator's feet in place on pedals 14a.

The operator in the left seat 13a steers vehicle 10 via handle bars 16a. Handle bars 16a attach to steering shaft 16b. Steering shaft 16b attaches to steering rod (not shown). Steering rod attaches to the left steering control arm (not shown). Tie rod 16c connects left steering control arm (not shown) to right steering control arm 16c.

The steering system is significant in that tie rod 16c directly connects the left steering arm (not shown) to the right steering arm 15b. This design keeps both front wheels parallel through out the suspension travel. Conventional steering designs do not keep the front wheels parallel through out the suspension travel. This steering design thus conserves energy.

The steering components, handle bar 16a, steering shaft 16b, steering rod, and steering control arms 15b, and tie rod 16c, are connected such that turning the handle bars 16a left and right causes the front wheels 12a to turn left and right permitting steering control of the vehicle 10.

Figure 2:
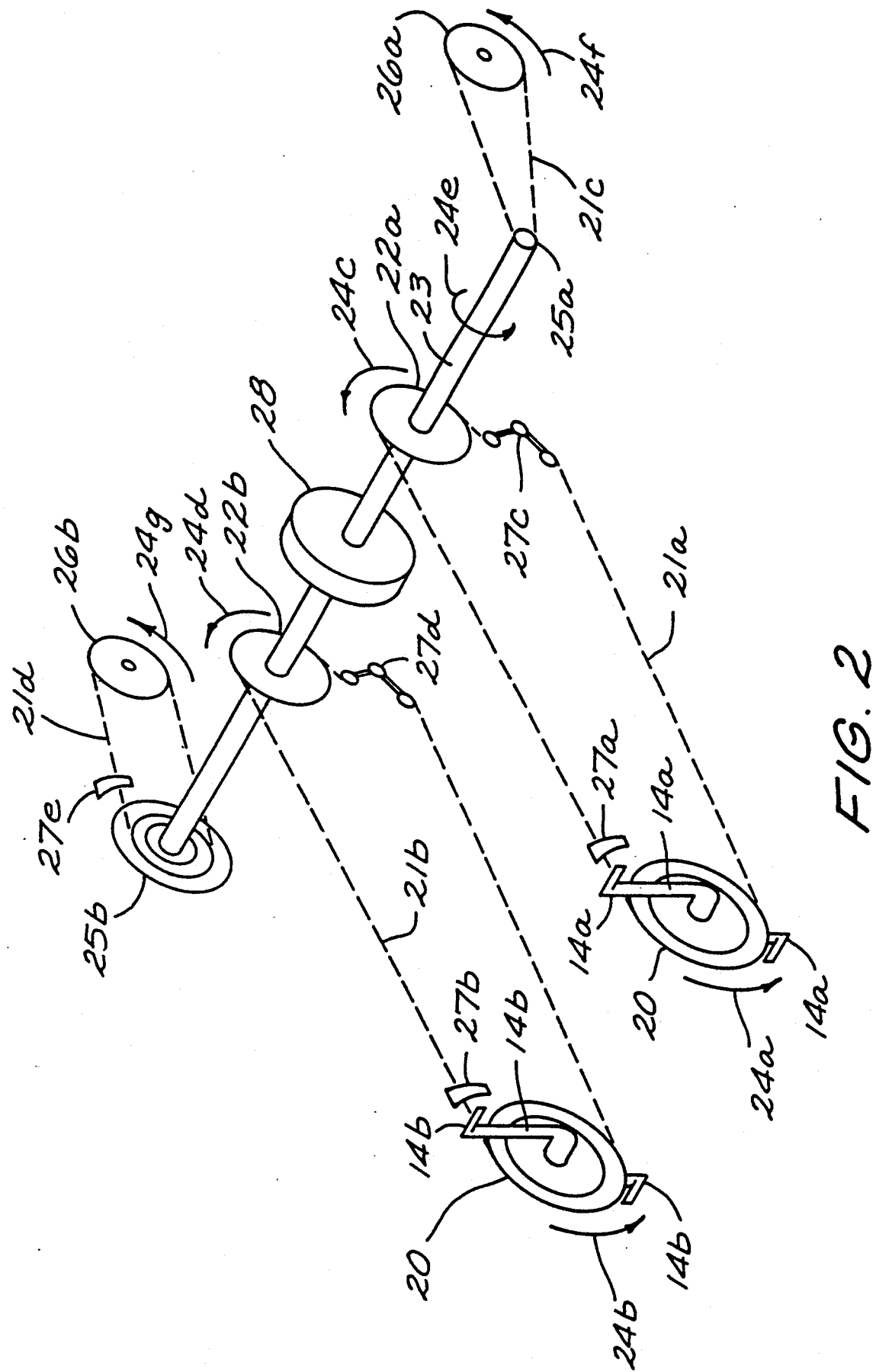
FIG. 2 shows the preferred embodiment of the drive train.

FIG. 2 shows the preferred embodiment of the drive train of vehicle 10.

Human operators (not shown) supply rotational energy via foot pedals 14a. Pedals 14a are rotatably attached to cranks 14b. Cranks 14b are rotatably attached to frame 10 (not shown). Chainrings 20 are attached to cranks 14b. Chainrings 20 engage primary chains 21a and 21b. Primary chains 21a and 21b engage multiple speed freewheels 22a and 22b respectively.

Multiple speed freewheels 22a and 22b are attached to drive bar 23 in a rachet arrangement. When multiple speed freewheels 22a and 22b rotate in the direction shown by arrows 24c and 24d, multiple speed freewheels 22a and 22b engage drive bar 23 and cause drive bar 23 to rotate in the direction shown by arrow 24e. When either multiple speed freewheels 22a or 22b stop rotating, however, drive bar 23 is free to continue rotating in the direction shown by arrow 24e. In other words, multiple speed freewheels 22a and 22b operate as a gear cog or freewheel on a conventional bicycle.

Drive bar 23 engages freewheel 25a and multi-speed freewheel 25b causing freewheel 25a and multi-speed freewheel 25b to rotate in the direction of arrow 24e. Freewheel 25a and multi-speed freewheel 25b attach to drive bar 23 in a ratchet arrangement. When drive bar 23 rotates in the direction of arrow 24e, drive bar 23 engages freewheel 25a and multi-speed freewheel 25b causing sprockets (not shown in detail) of freewheel 25a and multi-speed freewheel 25b to rotate in the direction of arrow 24e. When drive bar 23 slows or stops rotating, sprockets of freewheel 25a and multi-speed freewheel 25b are free to continue rotating in the direction of arrow 24e. In other words, freewheel 25a and multi-speed freewheel 25b operate like freewheels on conventional bicycles, but are used to drive sprockets instead of the sprockets driving the freewheels.

The preferred embodiment implements overdrive gearing by replacing a single speed freewheel with multi-speed freewheel 25b. FIG. 2 shows the right freewheel replaced with a multi-speed freewheel 25b. Either the left freewheel 25a or the right multispeed freewheel 25b can be a multi-speed freewheel to implement the overdrive gearing.

The overdrive gearing creates a much wider range of gears for use by the operators. When a low gear is desired, secondary chain 21d is shifted to the small sprocket (not shown) on the multi-speed freewheel 25b. When a higher gear is desired, secondary chain 21d is shifted to a larger sprocket (not shown) on the multi-speed freewheel 25b. Low gearing is typically used for off road or uphill travel and the higher gearing is typically used for on road or downhill travel.

In the preferred embodiment, the small sprocket of the multi-speed freewheel 25b is the same size as the single sprocket of left freewheel 25a. This allows both rear wheels (not shown) to be driven simultaneously when in low gear. When the overdrive is in a higher gear (i.e. when secondary chain 21d is engaged with a larger sprocket on the multi-speed freewheel 25b) only the right rear wheel (not shown) will be driven.

Freewheel 25a and multi-speed freewheel 25b engage and drive secondary chains 21c and 21d. Secondary chains 21c and 21d transfer rotational energy from freewheel 25a and multi-sped freewheel 25b to drive sprockets 26a and 26b causing drive sprockets 26a and 26b to rotate as shown by arrows 24f and 24g respectively.

Drive sprockets 26a and 26b are firmly attached to rear wheels (not shown). When drive sprockets 26a and 26b are made to rotate, rear wheels 12b (not shown) also rotate transferring rotational energy to the Ground and propelling the vehicle.

Shifting is accomplished by derailleurs 27a, 27b, 27c, 27d, and 27e. Front derailleurs 27a and 27b move primary chains 21a and 21b between chainrings 20 on cranks 15b. Rear derailleurs 27c and 27d move primary chains 21a and 21b between sprockets (not shown) on multiple speed freewheels 22a and 22b. Overdrive derailleur 27e moves secondary chain 21d between sprockets (not shown) on multi-speed freewheel 25b.

All derailleurs are controllable by the human operators (not shown). Left front derailleur 27a, left rear derailleur 27c and over drive derailleur 27e are controllable by the operator in the left seat. Right front derailleur 27b and right rear derailleur 27d are controllable by the operator in the right seat.

All components of the drive train are commonly known in the art. The pedals, cranks, chainrings, chains, derailleurs, freewheels, and multiple speed freewheels are commonly known in the art.

In alternate embodiments of the drive train, several alternate drive mechanisms are mechanically connected to drive bar 23. These alternate drive mechanism replace or supplement the pedal drive mechanism of the preferred embodiment. These alternate drive mechanisms include, but are not limited to hand cranks, hand pumps, gas engines, electric motors, and the like.

Yet another alternate embodiment adds flywheel 28 to drive bar 23. The weighted fly wheel 28 enhances vehicle performance in hilly terrain by minimizing the amount of gear shifting required.

FIG. 2 shows only the preferred embodiment of the drive train. Alternate embodiments of the drive train are envisioned. Those of ordinary skill in the art readily see other equivalent implementations of the drive train. Alternate embodiments include, but are not limited to, using belts, drive shafts, gear boxes, torque converters, and the like.

The unique design of the drive train makes these many alternate embodiments possible.

Figures 3A, 3B:
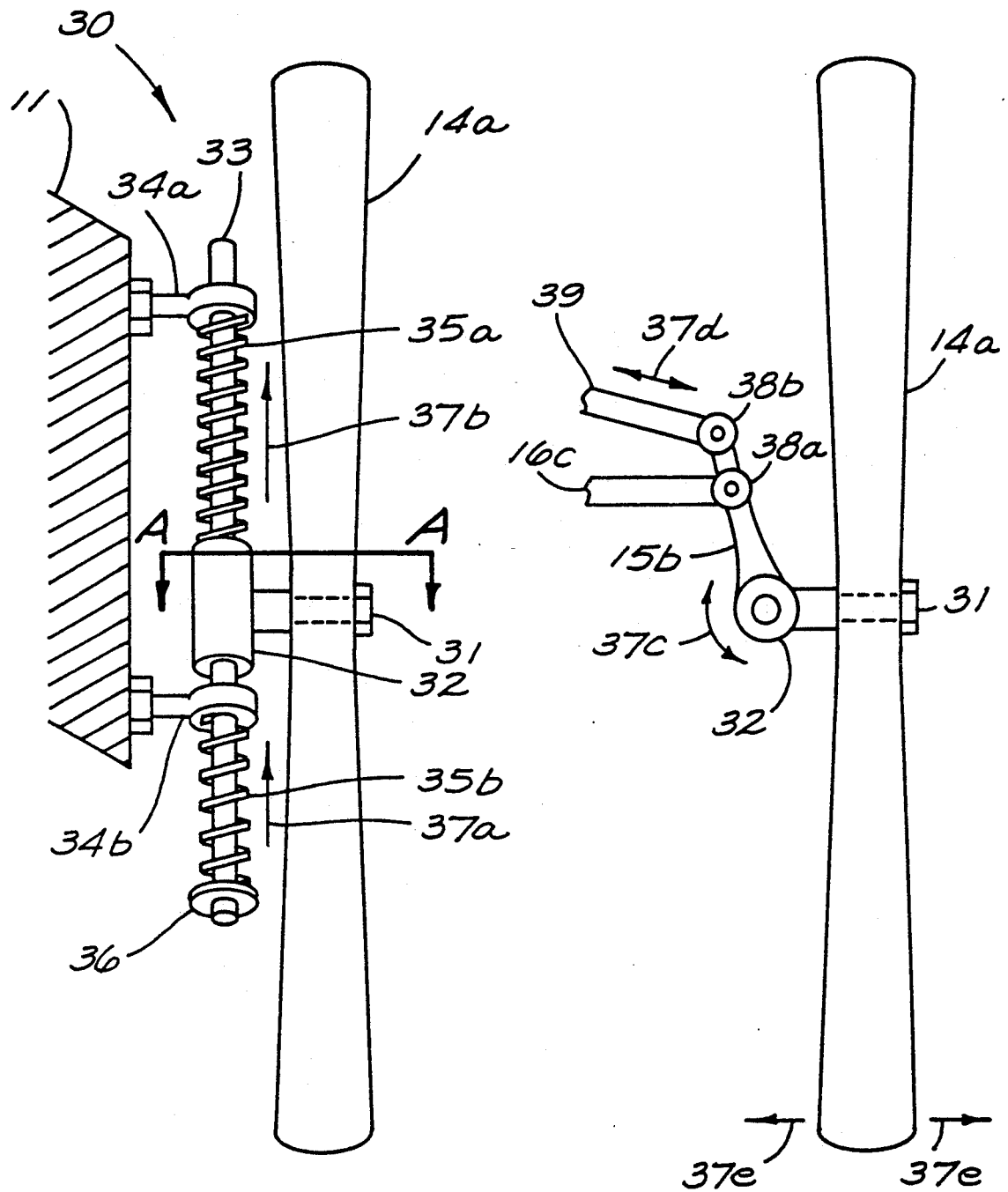
Figure 3C:
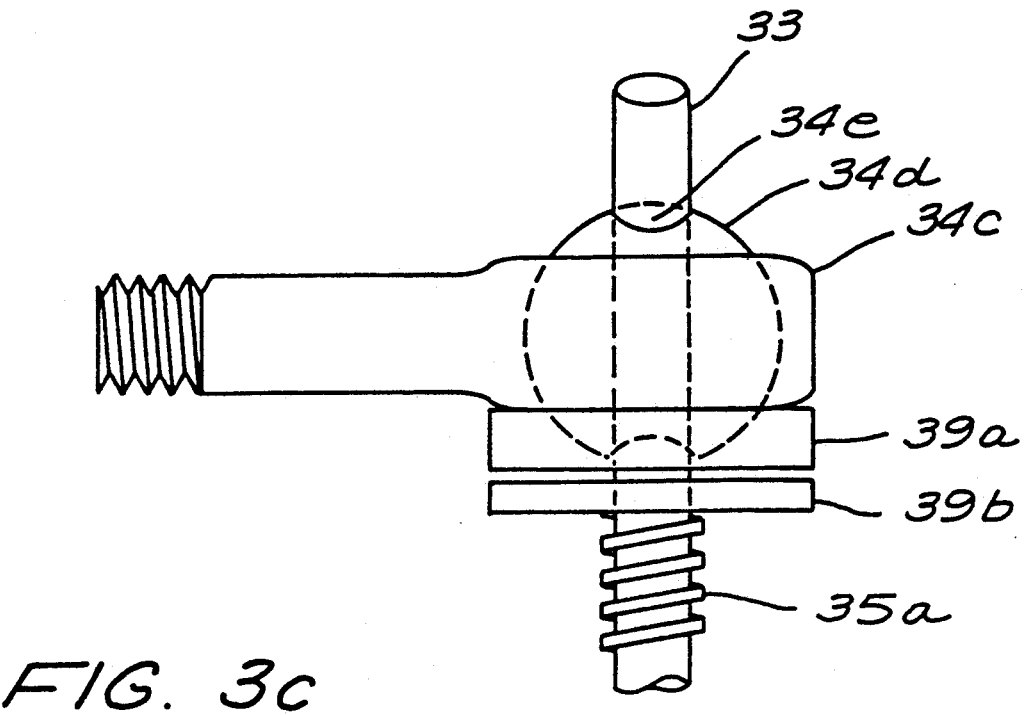
FIG. 3c shows the heim joint of the front suspension in detail.

FIGS. 3a, 3b, and 3c show the front suspension of the vehicle. Front suspension 30 is designed to keep front wheel 14a parallel to the other wheels (not shown) throughout the suspension travel.

FIG. 3a is a front view of the left front suspension. Axle 31 of front wheel 14a is attached to wheel support 32. Wheel support 32 is rigidly attached to suspension spindle 33. Suspension spindle 33 is movably attached to frame 11 via spherical rod end joints (i.e. heims) 34a and 34b.

Heims 34a and 34b are firmly attached to frame 11. Heims 34a and 34b have a hole through which suspension spindle 33 moves. The holes in heims 34a and 34b are slightly larger diameter than suspension spindle 33 allowing suspension spindle 33 to move freely in the vertical direction and rotate while restrained from movement in other directions. Heims 34a and 34b are described in detail in a following figure.

Springs 35a and 35b surround suspension spindle 33. Upper spring 35a surrounds suspension spindle 33 and is located between the bottom of heim 34a and the top of wheel support 32. Lower spring 35b is located between the bottom of heim 34b and spindle end plate 36.

Spindle end plate 36 is securely attached to the bottom end of suspension spindle 33. Spindle end plate 36 has a larger diameter than spring 35b and holds spring 35b on suspension spindle 33.

When downward force is exerted on frame 11 or when upward force is exerted by wheel 14a, wheel support 32, suspension spindle 33, and spindle end plate 36 move upward as shown by arrows 37. Springs 35 are compressed as suspension spindle 33 moves upward thus cushioning the transfer of force between wheel 14a and frame 11.

FIG. 3b is a cross sectional view along line 3a—3a of FIG. 3a.

Axle 31 of wheel 14a is attached to wheel support 32. Steering control arm 15b is an integral part of wheel support 32. Steering control arm 15b couples with steering rod 39 and tie rod 16c. Steering control arm 15b is coupled to steering rod 39 and tie rod 16c with rotatable heim joints 38a and 38b which allow movement both vertically and horizontally. Steering is accomplished by movement of the steering rod 39 as shown by arrows 37d. Steering rod movement causes wheel support 32 to rotate about its axis as shown by arrows 37c. Wheel support 32 causes wheel 14a to move as shown by arrows 37e which effects vehicle steering.

Steering control arm 15b is designed to provide toe-out on turns. Toe-out on turns reduces energy loss during turns. This is accomplished by using the correct Ackerman angle for steering control arm 15b. Ackerman angles and Ackerman steering linkages are known in the automotive art.

FIG. 3c shows the detail of heim joint 34a. Housing 34c holds ball 34d. Ball 34d rotates relative to housing 34c. Ball 34d has a hole 34e through it. The hole 34e is slightly larger diameter than the diameter of suspension spindle 33, allowing suspension spindle 33 to freely move through hole 34e.

Washers 38a and 38b surround suspension spindle 33 and are positioned between housing 34c and spring 35a. Washers 39a and 39b direct the load of spring 35a to housing 34c and not ball 34d. Helm joint 34b is the same design as helm joint 34a.

Figure 4A:
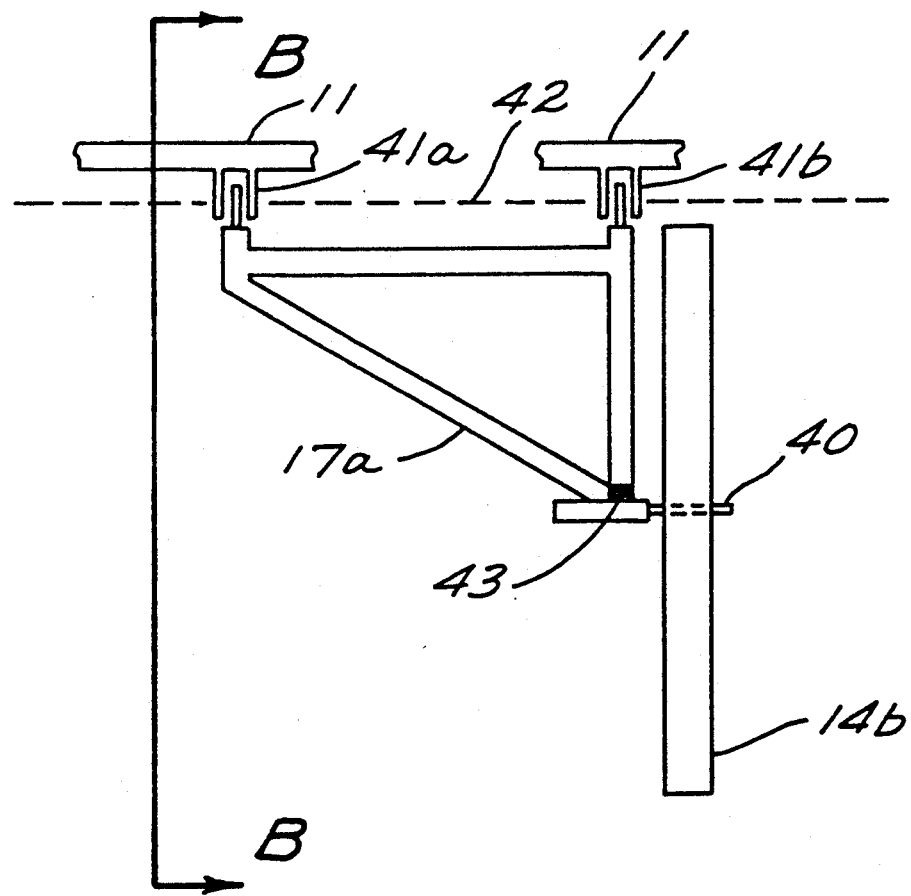
FIG. 4a shows the top view of the rear suspension system.

FIG. 4a is a top view of the left rear suspension system.

Axle 40 of rear wheel 14b attaches to suspension swing arm 17a. Suspension swing arm 17a attaches to frame 11 at attachment points 41a and 41b. Attachment points 41a and 41b are on the same axis 42. Suspension swing arm 17a is rotatably connected to frame 11 and is rotatable about horizontal axis 42. The design of suspension swing arm 17a permits wheel 14b to move vertically relative to frame 11 as needed for suspension purposes.

Figure 4B:
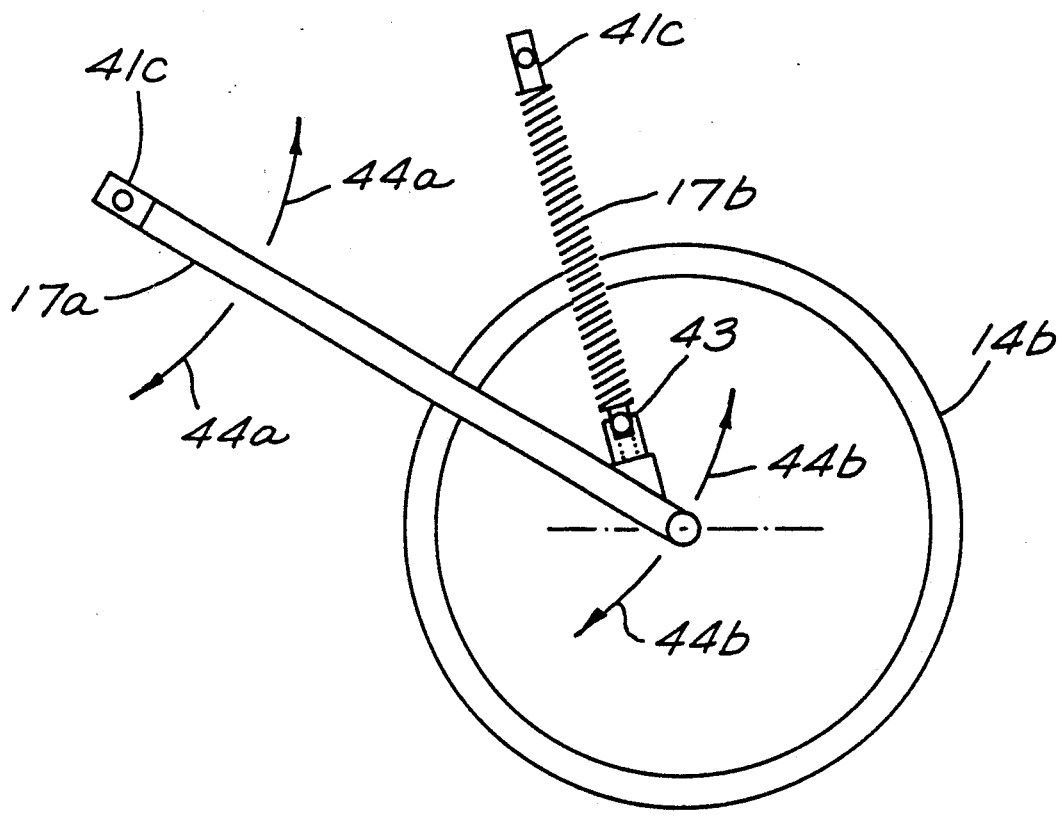
FIG. 4b shows the side view of the rear suspension system.

FIG. 4b is a side view of the rear suspension along line 4b—4b of FIG. 4a.

Suspension swing arm 17a attaches to axle 40 and frame 11 (not shown). Spring 17b attaches to suspension swing arm 17a at attachment point 43 and also to frame 11 at attachment point 41c.

Suspension swing arm is rotatably attached to frame 11 (not shown) at attachment point 41a and attachment point 41b (not shown). Suspension swing arm 17a moves about attachment points 41a and 41b as shown by arrows 44a.

Wheel 14b moves relative to frame 11 (not shown) as shown by arrows 44b. Spring 17b compresses and expands as wheel 14b moves relative to frame 11. Spring 17b cushions force transferred between wheel 14b and frame 11.

Figure 5:
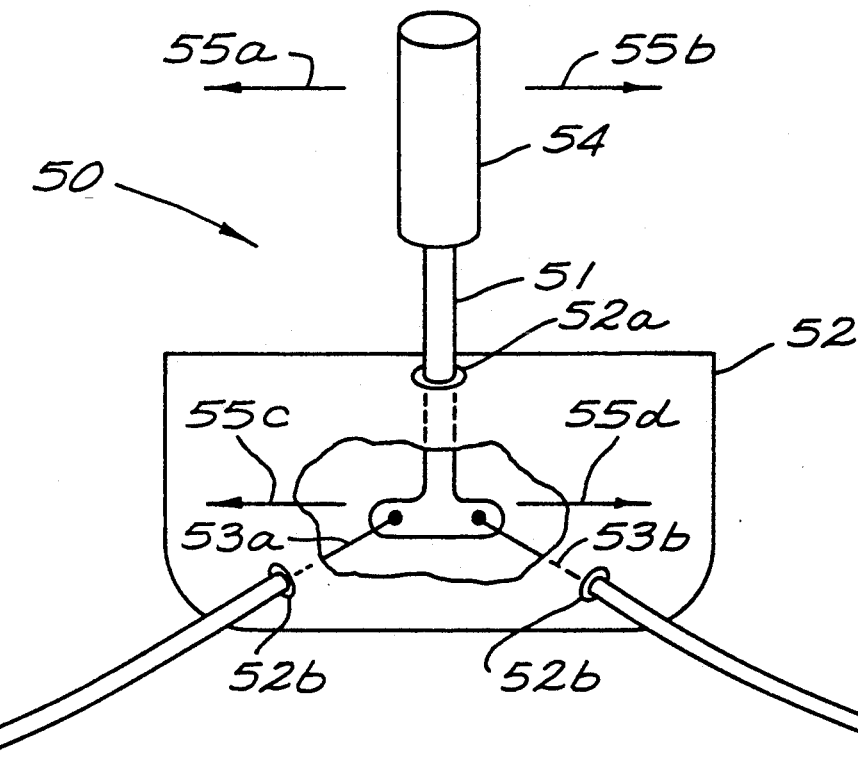
FIG. 5 is a cut out view of the brake control mechanism.

FIG. 5 shows a cut away view of the brake control mechanism.

Brake controller 50 allows the operator to control the braking action of each rear wheel (not shown) from a single control lever 51. Braking is applied equally to both rear wheels or is applied to only one rear wheel. Brake controller 50 also allows disproportionate braking to the rear wheels (e.g. braking on one wheel applied more or less then the braking on the other wheel). Brake controller 50 greatly increases the control and maneuverability of a three or four wheel human powered vehicle by improving turning and stopping characteristics.

The preferred embodiment mounts brake controller 50 between the seats of the vehicle.

Control stick 51 is pivotally attached to housing 52 at opening 52a. Brake cables 53 enter housing 52 through openings 52b. Brake cables 53a and 53b attach to end of control stick 51. Handle 54 attaches to opposite end of control stick 51.

Brakes are actuated by pulling on brake cables 53a and 53b. Movement of handle 54 in the direction of arrow 55a causes the lower end of control stick 51 to move in the direction of arrow 55d and causes pulling on brake cable 53a. Pulling brake cable 53a causes actuation of the attached brake (not shown). Movement of handle 54 in the direction of arrow 55a does not cause pulling of brake cable 53b and does not cause the attached brake to be activated.

Movement of handle 54 in the direction of arrow 55b causes the lower end of control stick 51 to move in the direction of arrow 55c causing pulling of brake cable 53b. Pulling brake cable 53b causes actuation of the attached brake (not shown). Movement of handle 54 in the direction of arrow 55b does not cause pulling of brake cable 53a and does not cause the attached brake to be activated.

Pulling the handle 54 out of the page (i.e. toward the reader) causes the lower end of control stick 51 to move away from the reader causing pulling on both brake cables 53a and 53b. Pulling both brake cables 53a and 53b causes actuation of both attached brakes (not shown).

FIGS. 1 through 5 have shown the preferred embodiment of the invention. Those skilled in the art readily see alternate embodiments which accomplish substantially the same result in substantially the same way.

It is clear from the foregoing that the present invention represents a new and useful human powered vehicle for both on and off road use.

What is claimed is:

1. A four wheeled human powered vehicle comprising:
   a) a frame;
   b) two front wheels rotatably attached to said frame;
   c) two rear wheels, each of said rear wheels rotatably attached to said frame;
   d) a drive bar rotatably connected to said frame;
   e) freewheel means connected to said drive bar mechanically connected to each of said rear wheels for transfer of rotational movement from said drive bar to each of said rear wheels and permitting each of said rear wheels to rotate at different speeds; and,
   f) at least two propulsion assemblies attached to said frame, each propulsion assembly having,
      1) a seating means for holding a human operator, and,
      2) a drive train means for transferring a crank movement to said driven bar, said drive train means having selective multiple gearing.

2. The four wheel human powered vehicle according to claim 1 further comprising two front suspensions, each of said two front suspensions having:
   1) an upper heim,
   2) a lower heim,
   3) a spindle slidably disposed through said upper heim and said lower heim,
   4) an axle attached to said spindle between said upper heim and said lower heim, and,
   5) biasing means for biasing said axle away from said upper heim.

3. The four wheeled human powered vehicle according to claim 1 wherein said freewheel means has selective multiple gearing.

4. The four wheeled human powered vehicle according to claim 3 further comprising a brake control mechanism having:
   a) a housing having an opening suitable for receiving a control stick,
   b) a control stick having a first end and a second end and pivotally disposed through said opening,
   c) a first brake cable means connected to said first end of said control stick for actuating braking on a first one of said two rear wheels, and
   d) a second brake cable means connected to said first end of said control stick for actuating braking on a second one of said two rear wheels.

5. The four wheeled human powered vehicle according to claim 4 further comprising shifting means for controlling said selective multiple gearing of said drive train means and for controlling said selective multiple gearing of said freewheel means, said shifting means controllable by a human operator.

6. A four wheeled machine comprising:
   a) a frame;
   b) two front wheels rotatably attached to said frame;
   c) two rear wheels, each of said rear wheels rotatably attached to said frame;
   d) a drive bar rotatably connected to said frame;
   e) freewheel means connected to said drive bar mechanically connected to each of said two rear wheels for transfer of rotational movement from said drive bar to each of said two rear wheels and permitting each of said two rear wheels to rotate at a different speeds; and,
   f) at least two human propulsion assemblies attached to said frame, each of said human propulsion assembly having,
      1) a seating means for holding a human operator, and,
      2) a driving mechanism means for transferring a crank movement to said drive bar, said driving mechanism means having selective multiple gearing.

7. The four wheeled machine according to claim 6 wherein said freewheel means has selective multiple gearing.

8. The four wheeled machine according to claim 6 wherein said frame includes
   two front suspensions, each of said two front suspensions having:
   1) an upper heim,
   2) a lower heim,
   3) a spindle slidably disposed through said upper heim and said lower heim,
   4) an axle attached to said spindle between said upper heim and said lower heim, and,
   5) biasing means for biasing said axle away from said upper heim.

9. The four wheeled machine according to claim 8 further comprising a brake control mechanism having:
   a) a housing having an opening suitable for receiving a control stick,
   b) a control stick having a first end and a second end and pivotally disposed through said opening,
   c) a first brake cable means connected to said first end of said control stick for actuating braking on a first one of said two rear wheels, and,
   d) a second brake cable means connected to said first end of said control stick for actuating braking on a second one of said two rear wheels.

10. The four wheeled machine according to claim 8 further comprising a steering system having:
    a) handle bar means for turning a steering shaft;
    b) steering shaft means connected to said handle bar means for transferring movement from said handle bar means to a steering rod;
    c) steering rod means connected to said steering shaft means for transferring movement of said steering shaft means to a control arm;
    d) a first control arm having a first end rotatably connected to said steering rod means and a second end mechanically linked to a first of said two front wheels;
    e) a tie rod having a first end and a second end, said first end rotatably connected to a mid portion of said first control arm; and,
    f) a second control arm having a first end rotatably connected to a second end of said tie rod and a second end mechanically linked to a second of said two front wheels.

11. A four wheeled human powered vehicle comprising:
    a) a frame;
    b) two front wheels rotatably attached to said frame;
    c) two rear wheels, each of said rear wheels rotatably attached to said frame;
    d) a drive bar rotatably connected to said frame;
    e) freewheel means connected to said drive bar mechanically connected to each of said two rear wheels for transfer of rotational movement from said drive bar to each of said two rear wheels and permitting each of said rear wheels to rotate at different speeds; and, f) at least one human propulsion assembly attached to said frame, each human propulsion assembly having,
1) a seating means for holding a human operator,
2) a crank rotatably attached to said frame,
3) a set of pedals rotatably attached to said crank,
4) a chain ring attached to said crank,
5) a chain engaged with said chain ring, and,
6) a multiple speed freewheel attached to said drive bar and engaged with said chain, said multiple speed freewheel controllable by a human operator for implementing selective multiple gearing for each human operator.

12. The four wheeled human powered vehicle according to claim 11 wherein said frame further includes:
a) at least two rear suspension means for supporting said frame above said rear wheels; and,
b) two front suspensions, each of said two front suspensions having:
1) an upper heim,
2) a lower heim,
3) a spindle slidably disposed through said upper heim and said lower heim,
4) an axle attached to said spindle between said upper heim and said lower heim, and,
5) biasing means for biasing said axle away from said upper heim,.

13. The four wheeled human powered vehicle according to claim 12 wherein said freewheel means includes means for selective multiple gearing.

14. A four wheeled human powered vehicle comprising:
a) a frame;
b) two front wheels, each of said front wheels rotatably attached to said frame;
c) two rear wheels, each of said rear wheels rotatably attached to said frame;
d) a human propulsion assembly attached to said frame for transferring a crank movement to said two rear wheels; and,
e) two rear suspensions, each of said two rear suspensions having,
1) a suspension swing arm having a first end and a second end, said first end rotatably connected to said frame allowing rotation about a horizontal axis, said second end rotatably connected to one of said two rear wheels;
2) biasing means having a lower end connected to said second end of said suspensions swing arm and having an upper end connected to said frame for biasing said suspension swing arm away from said frame.

15. A four wheeled human powered vehicle comprising:
a) a frame;
b) two front wheels rotatably attached to said frame;
c) two rear wheels rotatably attached to said frame;
d) a human propulsion assembly attached to said frame for transferring a rotational movement to said two rear wheels; and,
1) an upper heim,
2) a lower heim,
3) a spindle slidably disposed through said upper heim and said lower heim,
4) an axle attached to said spindle between said upper heim and said lower heim, and,
5) biasing means for biasing said axle away from said upper heim.

* * * * *